United States Patent [19]
Boulet

[11] 3,807,540
[45] Apr. 30, 1974

[54] GRAIN SPOUT

[76] Inventor: Bernard Boulet, Box 456, Falher, Alberta, Canada

[22] Filed: July 14, 1972

[21] Appl. No.: 271,907

[30] Foreign Application Priority Data
Aug. 12, 1971 Canada .............................. 120348

[52] U.S. Cl........................... 193/9, 193/16, 193/22, 193/25 E, 302/64
[51] Int. Cl........................................... B65g 11/10
[58] Field of Search ............... 193/2 A, 4, 9, 14, 16, 193/22, 23, 25 E; 302/60, 63, 64

[56] References Cited
UNITED STATES PATENTS
| | | | |
|---|---|---|---|
| 3,011,612 | 12/1961 | Olsen | 193/22 |
| 2,997,150 | 8/1961 | Emanuelson | 193/25 E |
| 2,713,929 | 7/1955 | Castendyck | 193/16 X |

*Primary Examiner*—Evon C. Blunk
*Assistant Examiner*—W. Scott Carson
*Attorney, Agent, or Firm*—Ernest Peter Johnson

[57] ABSTRACT

A modified spout, for use in steel grain-loading hoses, is provided. The spout includes a circumferential channel attached to its outer surface. A hinged split ring, having a locking clamp, is provided within the channel. The clamp functions to lock the ring in place. The ring carries apertured lugs which can be pinned to the two chains running along the sides of the hose to suspend the spout as part of the hose. When the spout is worn through by the flow of abrasive grain, the clamp is undone, the spout is rotated within the ring to present a fresh surface to the grain flow, and the clamp is then tightened to lock the ring and spout together again.

1 Claim, 6 Drawing Figures

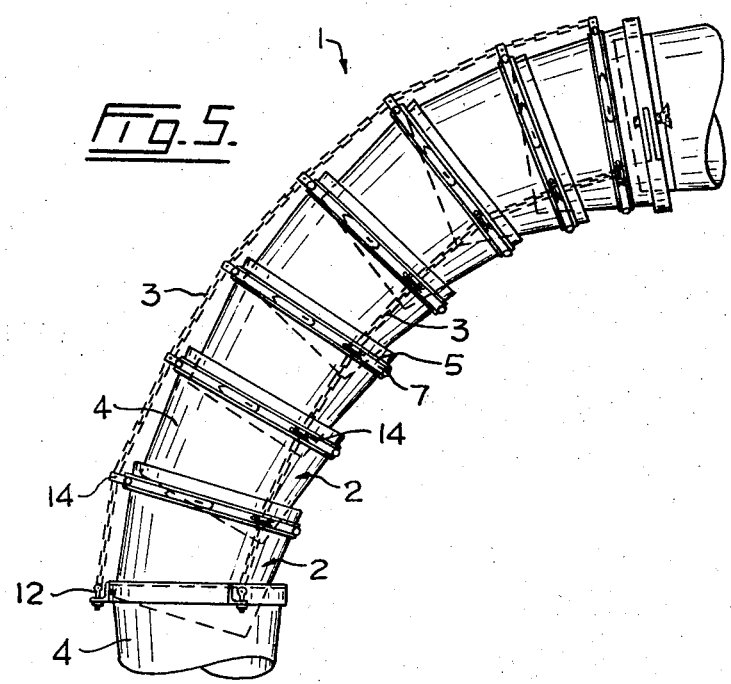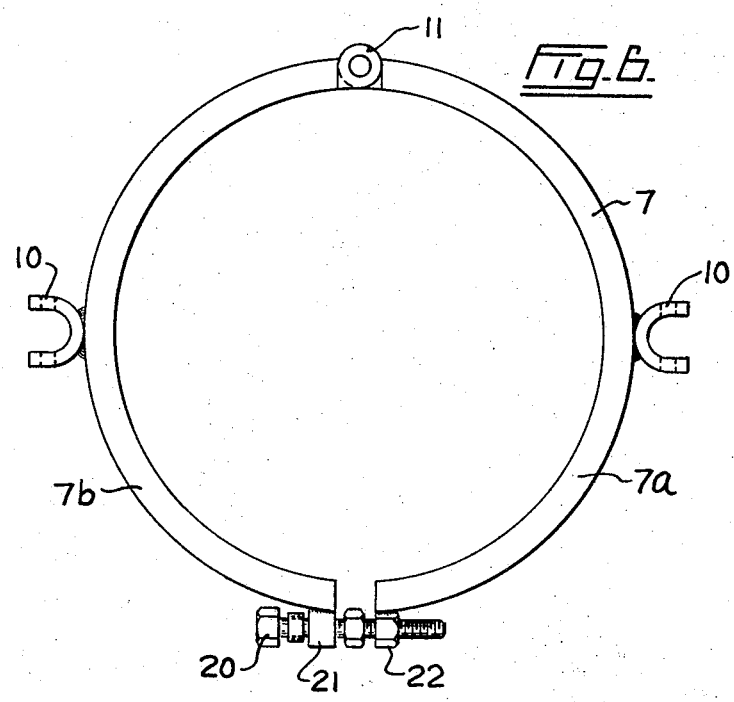

GRAIN SPOUT

BACKGROUND OF THE INVENTION

This invention relates to a spout assembly for use in a flexible hose, such as is used in loading grain and the like.

Flexible steel hoses are used to deliver grain from storage elevators to containers, such as box cars or trucks. These hoses usually comprise a series of tapered, tubular spouts partially nested one in another and suspended from a pair of chains running along each side of the spouts. Pairs of apertured, spaced lugs are mounted on the spout at 90° intervals around its circumference. A link from each chain is inserted between a pair of lugs and a pin is used to lock the lugs and link together. Typical examples of the prior art are shown in U.S. Pat. Nos. 2,997,150 and 2,772,764.

When grain moves through the spout, it rapidly wears a hole through its underside. This is particularly the case at bends in the hose. Frequently one or more spouts in a hose will begin leaking during the period of time that it takes to load two boxcars.

When a leak occurs, the operator must stop the grain flow, undo the spout from the chains, rotate it 90°, pin it back into the chains, and re-start the grain flow. It will be recognized that this is an unwelcome occurrence since it ties up labor and extends the loading time. It will also be noted that the spouts can only be rotated four times before they are discarded.

SUMMARY OF THE INVENTION

With the foregoing in mind, it is an object of this invention to provide a spout assembly whose spout can be rotated without having to disconnect it from the hose chains.

It is another object to provide a spout which can be quickly converted between locked and rotatable conditions.

It is another object to provide a spout which can be turned through a short arc and locked in place to present a fresh surface to grain flow.

In accordance with the invention, a spout is provided which has a channel mounted about its circumference. A split ring is positioned within the channel. When not tightened, the ring is free to slide longitudinally therein. Two pairs of apertured lugs extend outward from the ring. The spout can be suspended from the hose chains by connecting each pair of lugs to one of the chain links with a pin or like means. The ring is also provided with a clamp. When actuated, this clamp functions to tighten the ring about the spout so that they are locked together. In use, when the underside of the spout has been worn through, the clamp is loosened and the spout rotated within the ring until a fresh surface is presented to the grain flow. The clamp is then again tightened and the spout is ready for further use.

The assembly is characterised by several desirable features. More particularly, the spout can be quickly converted from a locked to a slidable condition and rotated without disconnecting the assembly from the chains. During this operation, the grain flow does not have to be turned off. In addition, the spout need only be rotated through a sufficient arc to remove the leak area from the grain flow; thus the life of the spout is increased in comparison to the prior art spouts.

Broadly stated, the spout assembly is for use in a flexible hose, formed of longitudinally nested spouts suspended from support elements, and comprises: a tapered, tubular spout; and suspension means disposed in circumferential contact with the spout and adapted to be connected with the support elements to suspend the spout therefrom, said suspension means and spout being slidably associated so that the spout may be rotated within the suspension means. In a more detailed embodiment, channel means is secured to the spout around its circumference; the suspension means comprises a split ring slidably disposed in the channel means and having attachment means for connection with the support elements to suspend the spout therefrom; and locking means is associated with the split ring, said means being adapted to be engaged to tighten the ring around the spout so as to lock them together to prevent sliding movement.

DESCRIPTION OF THE DRAWINGS

In the drawings:

FIG. 5 is a perspective view of the ring clamped in place in the channel with the spout assembly in place in a hose.

FIG. 6 is a top plan view of the ring with an alternative locking arrangement.

DESCRIPTION OF THE PREFERRED EMBODIMENT

Figure 1:
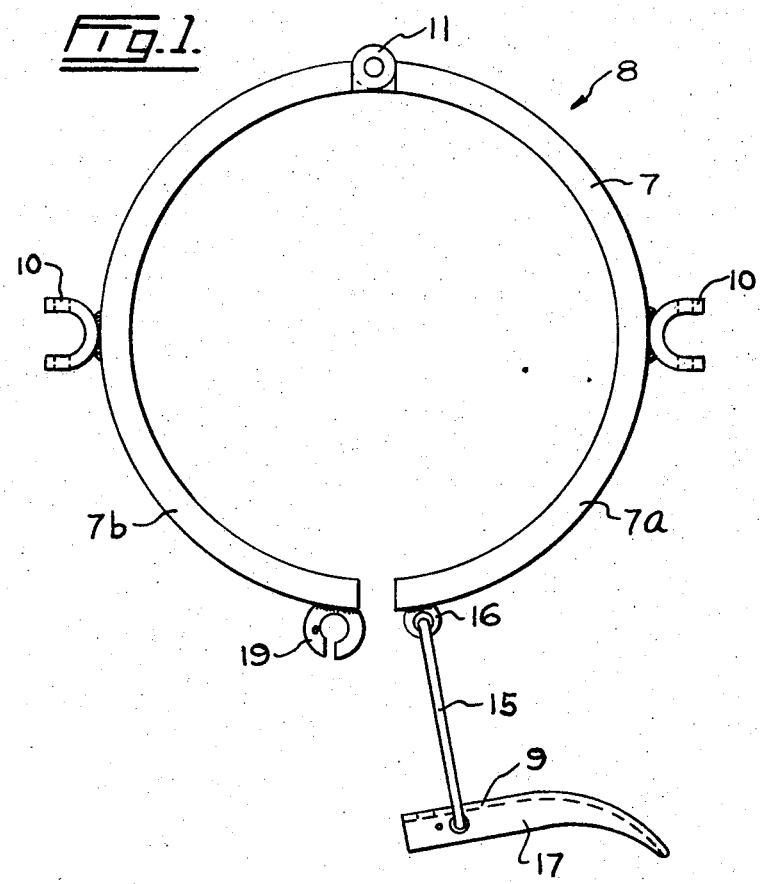
FIG. 1 is a top plan view of the ring.

Turning to FIG. 5, there is shown a grain-loading hose 1. The hose 1 comprises a series of spout assemblies 2 suspended from a pair of support elements or chains 3. The spout assemblies 2 each have a tapered, tubular spout 4; the spouts 4 are partially nested, one in another, to provide a flexible conduit.

Figure 2:
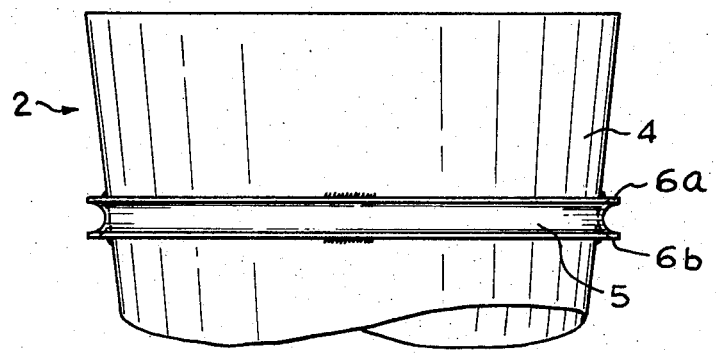
FIG. 2 is a side view of the portion of the spout carrying the channel.
Figure 3:
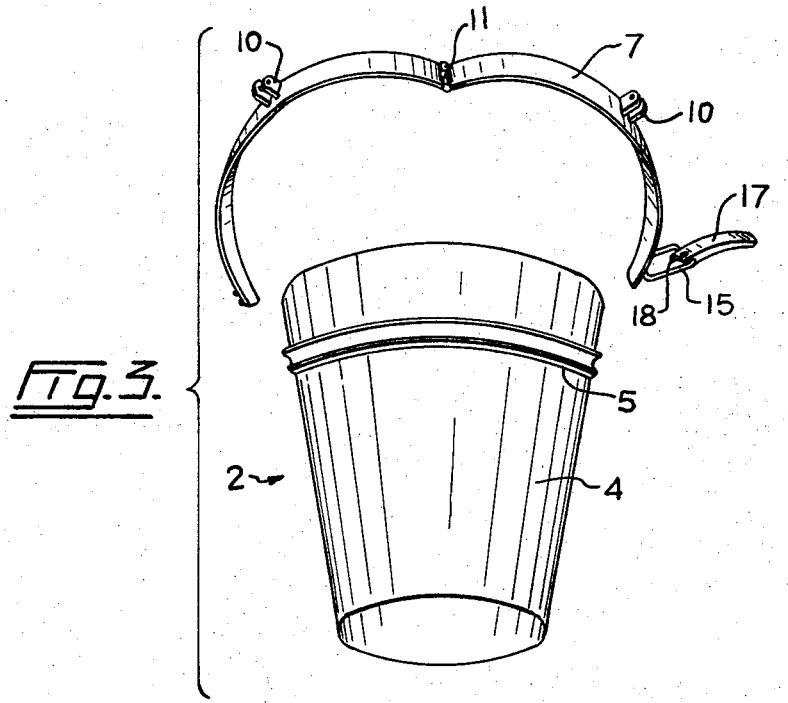
FIG. 3 shows a perspective view of the spout assembly with the ring separated from the spout.
Figure 4:
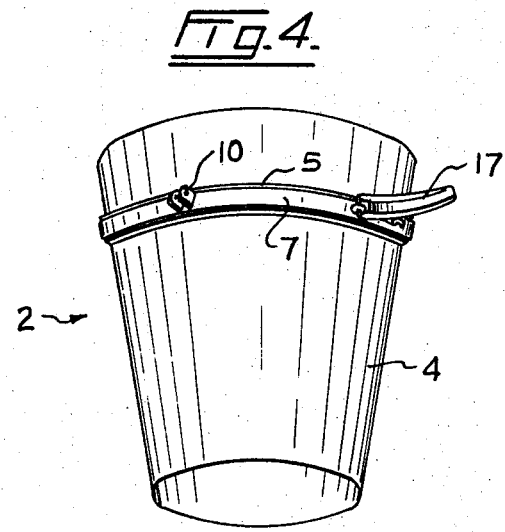
FIG. 4 is another perspective view showing the ring in the loosened condition, in place in the channel.

As shown in FIG. 2, each spout 4 has a channel 5 secured around its outer periphery. The channel 5 is U-shaped in cross section. It provides upper and lower circumferential shoulders 6a, 6b against which the split ring 7 abuts.

Suspension means 8 is associated with the spout 4. With reference to FIG. 1, the suspension means 8 comprises a split ring 7 having a locking clamp 9 and two pairs of lugs 10 attached thereto. The split ring 7 is hinged at 11 so that it can be opened and easily slipped into the channel 5 to circumscribe the spout 4. The two pairs of spaced, apertured lugs 10 are attached to opposite sides of the ring 7. To mount the spout assembly 2 in the hose 1, a pin 12 is inserted through each pair of lugs 10 and a link of one of the chains 3. A cotter pin 14 fixes the pin 12 in place. The locking clamp 9 includes a pivot ring 15. This ring 15 is pivotally connected at its inner end to the eye 16 (attached to the ring-half 7a) and at its outer end to the handle 17. The handle 17 has a locking pin 18 adapted to seat in the split washer 19 attached to ring-half 7b. When pin 18 is seated in washer 19 and handle 17 is pivoted toward ring-half 7b, the two slidable ring-halfs 7a, 7b are pulled together. In this manner, the split ring 7 can be tightened around spout 4 and locked in place. In an alternative version shown in FIG. 6, a screw 20 is used to cooperate with threaded lugs 21, 22 to tighten the ring halves 7b, 7a together. When the underside of spout 4 is worn through in use, the handle 17 is undone so that split ring 7 is loosened. The spout 4 can then be rotated, to present a fresh surface to the flow, and again locked in place.

What is claimed is:

1. A flexible hose comprising a plurality of longitudinally nested spouts suspended from support elements, each said spout assembly comprising:

a tapered, tubular spout;

U-shaped channel means secured to the spout around its circumference and above its longitudinal midpoint;

suspension means comprising a split ring slidably disposed in the channel means and having attachment means connected with the support elements; and locking means, associated with the split ring, adapted to be engaged to tighten the ring around the spout so as to lock them together to prevent sliding movement.

* * * * *